United States Patent [19]
Krejci

[11] Patent Number: 6,136,204
[45] Date of Patent: Oct. 24, 2000

[54] APPARATUS FOR TREATING A PROCESS FLUID

[75] Inventor: Phillip P. Krejci, Mt. Horeb, Wis.

[73] Assignee: Aramark Uniform and Career Apparel, Inc., Burbank, Calif.

[21] Appl. No.: 09/176,601

[22] Filed: Oct. 21, 1998

[51] Int. Cl.⁷ .................................................. B01D 19/00
[52] U.S. Cl. ........................... 210/744; 68/18 R; 134/10; 134/109; 95/8; 95/24; 95/226; 96/157; 96/351; 210/96.1; 210/167; 210/188; 210/805
[58] Field of Search ............................... 210/85, 86, 96.1, 210/104, 109, 110, 112, 115, 134, 167, 188, 194, 218, 220, 739, 744, 800, 805; 95/24, 226, 263, 8; 96/157, 202, 351, 156, 244; 134/10, 109; 68/18 R

[56] References Cited

U.S. PATENT DOCUMENTS

| | | | |
|---|---|---|---|
| 4,251,365 | 2/1981 | Speece | 261/121 R |
| 4,465,593 | 8/1984 | Wemhoff | 210/96.1 |
| 4,855,023 | 8/1989 | Clark et al. | 134/109 |
| 4,954,222 | 9/1990 | Durr et al. | 68/18 R |
| 5,116,515 | 5/1992 | Selesnick | 210/188 |
| 5,225,086 | 7/1993 | Vuletic | 210/712 |
| 5,236,580 | 8/1993 | Kelleher | 210/188 |
| 5,348,588 | 9/1994 | Winston | 134/10 |
| 5,451,320 | 9/1995 | Wang et al. | 210/604 |
| 5,466,367 | 11/1995 | Coate et al. | 210/96.1 |
| 5,527,459 | 6/1996 | Ikeda et al. | 210/188 |
| 5,545,316 | 8/1996 | Kazama et al. | 210/188 |
| 5,552,051 | 9/1996 | Wang et al. | 210/604 |
| 5,603,825 | 2/1997 | Costinel | 210/109 |
| 5,624,502 | 4/1997 | Defraites, Jr. | 134/10 |

*Primary Examiner*—Joseph W. Drodge
*Attorney, Agent, or Firm*—King and Schickli, PLLC

[57] ABSTRACT

An automatic control apparatus for effecting the continuous removal of contaminants, such as volatile organic compounds (VOCs) from a process fluid, such as water used to wash print towels or the like. The apparatus includes a pump for circulating wash water from a washer to a treatment tank. A diffuser is provided for air stripping the contaminants from the wash water in the tank. The diffused gas is exhausted through a vent in the tank, and a contaminant emissions concentration sensor detects the composition of VOCs in the exhaust. A controller signals the pump to vary the circulation based on the emissions concentration detected by the sensor. The wash water is continuously recirculated to the washer until a predetermined emissions concentration is reached. A drain in the tank releases the treated wash water to the environment. To reduce the cycle time of the process, a holding tank may be included in the control apparatus for temporarily storing a particularly contaminated portion of water while a second, less contaminated portion is processed. The first portion is then treated as the washer enters the regular wash cycle. A method of treating a process fluid to remove contaminants is also provided.

13 Claims, 3 Drawing Sheets

APPARATUS FOR TREATING A PROCESS FLUID

TECHNICAL FIELD

The present invention relates generally to an apparatus for removing contaminants from a process fluid and, more particularly, to an automatically controlled apparatus and related method for continuously recirculating and treating a contaminated process fluid until that fluid is cleaned to a predetermined acceptable level.

BACKGROUND OF THE INVENTION

Many substances which are considered contaminants, such as volatile organic compounds (VOCs), are widely used as an indispensable part of many industrial processes. During such uses, it is inevitable that articles or process fluids become contaminated with the VOCs. In recent decades, heightened awareness of the deleterious effects of these compounds has led to the realization that efficient, effective devices or processes must be developed for treating such articles prior to reuse or such fluids prior to discharge into the environment. With regard to the latter, exemplary treatment systems can be found in U.S. Pat. No. 5,552,051 to Wang et al. for a soil washing system that removes VOCs from wash water and U.S. Pat. No. 5,348,588 to Winston covering a system for the removal of various contaminants, including VOCs, from water used to wash electronic circuit assemblies.

A particular area of concern is with the washing of articles contaminated with VOCs and the further treatment of the water used to clean such articles. Examples of such articles include towels used for cleaning solvents from printing presses ("print towels"), shop towels, floor mats, or uniforms worn by workers in industrial locations. As should be appreciated, the extensive use and reuse of such items in a wide variety of industries creates a large quantity of contaminated articles that must regularly be washed.

During the conventional wash process, the articles are saturated with fresh water and are thoroughly washed with the goal of removing substantially all contaminants present. Although such washing is effective for removing a wide variety of contaminants from the articles (usually cleaning compounds, such as surfactants), it should be appreciated that the wash process simply transfers the contaminants, including VOCs, to the wash water. Thus, the contaminants are free to re-associate with the articles being washed. This of course reduces the effectiveness of the wash process.

One solution is to continuously discharge the contaminant laden water and replacing it with potable water, much like is done in home washing machines. While providing effective cleaning action, this approach disadvantageously results in a significant waste of important natural resources and also introduces further inefficiency into the wash process. Moreover, the discharged wash water will ultimately require treatment prior to release to comply with various governmental regulations seeking to ensure that the deleterious effects of VOCs, etc. upon the environment are minimized. Separate treatment processes further hinder the efficiency of the wash process and require significant operator intervention and monitoring to ensure that the process is effectively removing contaminants. Indeed, the presently known treatment systems use flotation principles and filtering to remove grease, oils, and heavy metals, but such treatment methods generally simply do not effect a significant reduction in the VOC levels in the wash water.

Therefore, a need is identified for an apparatus for treating a process fluid that is used to remove contaminants from articles, such as water used to wash print towels contaminated with VOCs. To reduce the consumption of water and enhance process efficiency, the apparatus would circulate and treat the wash water to remove contaminants, while at the same time monitoring the contaminant level and continuing the wash process. Automatic process controls would actuate the apparatus to continuously recirculate the wash water until an acceptable level of cleaning is reached. The wash water could then be discharged to the environment.

SUMMARY OF THE INVENTION

Keeping the aforementioned needs in mind, it is a primary object of the present invention to provide an improved apparatus and related method for treating a contaminated process fluid by recirculating the fluid through a treatment tank until clean and/or a predetermined and acceptable contaminant level is reached.

Another object of the present invention is to provide an apparatus for use in pre-washing print towels to remove VOCs in an effective and efficient manner, said apparatus: (1) having automatic controls for circulating a process fluid to and from a process tank while continuously diffusing a gas through the fluid to remove contaminants; (2) detecting the emission concentrations of the exhaust; (3) recirculating the fluid depending on the level of contaminant detected; and (4) releasing the fluid to the environment only when cleaned to an acceptable level as indicated when a predetermined emission concentration level is reached.

Still another object is to provide an automatically controlled apparatus for treating a process fluid that further includes a holding tank for reserving a first portion of the process fluid while a second portion of wash water is circulated for treatment, thereby increasing the efficiency of the wash process.

A further object of the present invention is to provide a related method of treating a process fluid, including the steps of supplying the process fluid to a tank, diffusing a gas through the process fluid for stripping contaminants, sensing an emission concentration of contaminants in the gas exhausting from the process fluid, and recirculating the process fluid through the tank until said emission concentration level reaches a predetermined level.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, an improved, automatically controlled apparatus is provided for continuously circulating and treating a process fluid to remove contaminants while continuing the fluid dependent process. More specifically, contaminants in the fluid are gas stripped while the fluid continuously recirculates to and from the wash process. The emissions concentration in the exhaust is constantly detected while the apparatus continuously recirculates the fluid until a predetermined emissions concentration level is reached: that level being indicative of an acceptably cleaned process fluid. The automatic control advantageously reduces process time, improves accuracy of contaminant level reduction, saves natural resources, and eliminates the need for constant operator intervention, monitoring, or sampling of the process fluid to determine whether contaminant levels are acceptable for release to the environment.

In the preferred embodiment, the apparatus includes a process tank for treating the process fluid to remove contaminants, which for purposes of illustration is water used to prewash print towels contaminated with solvents containing volatile organic compounds (VOCs). Continuous circulation of the process fluid through the process tank is provided through a fluid circuit formed between an inlet in the tank for receiving the wash water from a washing apparatus, an outlet for returning the wash water to the washing apparatus, and at least one pump. The washing apparatus is a print towel washer that holds VOC-laden towels, with the process described preferably being a pretreatment (prewash) cycle that is commenced prior to the regular wash cycle to ensure that a substantial amount of the VOCs are removed from the towels prior to conventional washing.

As should be appreciated, the circulating water picks up the VOCs as it circulates through the washer. Removal of VOCs from the circulating wash water is completed by diffusing a gas through the wash water as it passes through the process tank. Upon exiting the wash water, the contaminant laden gas is exhausted through a vent in the process tank for treatment prior to release to the atmosphere. Positioned adjacent to the vent is an emission concentration sensor that constantly detects the emission concentration of contaminants in the exhaust gas and reports the detected level to a controller. If the contaminant level in the emissions is above a predetermined acceptable concentration level, the controller continues the operation of the pumps to recirculate the fluid through the process tank. Recirculation continues until a predetermined emission concentration level is reached, after which the wash water is either treated further to remove other types of contaminants, reused, or released to the environment. Advantageously, the continuous circulation between the process tank and the washing apparatus allows the wash process to proceed using the same process fluid while the contaminant level is constantly being reduced by the stripping process, thereby reducing water consumption and increasing process efficiency.

In accordance with an important aspect of the invention, the efficiency of the treatment process is further enhanced by the use of automatic process controls that are actuated by the controller primarily in response to signals received from the gas sensor and a water level sensor positioned in the process tank. More specifically, an external inlet is provided for supplying a fresh fluid, such as potable water, to the process tank to mix with the wash water coming from the washer. After the process tank is filled with the fresh fluid to a predetermined level as determined by the fluid level sensors, the treatment process begins. More particularly, the controller signals a blower to supply fresh air to the diffuser, which is positioned below the level of potable water and more preferably adjacent to the bottom of the process tank. To ensure that the VOC laden diffused gas exhausting from the water does not build up in the tank, the controller simultaneously actuates an exhaust fan positioned in fluid communication with the vent in the process tank.

Once diffusion is established, the controller actuates the one or more pumps to circulate the wash water through the fluid circuit formed between the process tank and the washing apparatus. In the preferred embodiment, the pump is pneumatic and a compressor is provided with a control valve selectively actuated by the controller to supply compressed air thereto. The pump initially draws potable water from the process tank and supplies it to the washing apparatus, while simultaneously admixing contaminated fluid from the washing apparatus with the potable water in the process tank. As the admixed fluid circulates, the emissions concentration of the diffused gas exhausting from the process tank is continuously monitored by the emissions concentration sensor positioned adjacent to the vent. The controller receives the emissions concentration signal from the gas sensor, compares it with a predetermined acceptable emissions concentration level, and so long as the measured concentration exceeds the predetermined concentration level signals the control valve associated with the compressor to remain in an open position, thereby causing the pumps to continuously recirculate the water.

Once the measured concentration level equals or falls below the predetermined emission concentration level, the controller signals both the control valve to deactivate the recirculation pump and a drain valve to open in the bottom of the process tank to release the treated wash water. The drain valve is then closed and the process repeats with potable water filling the process tank and the reloading of the washing apparatus. As should now be appreciated, the apparatus of the present invention provides for the automatic continuous treatment of the wash water while the wash process continues, thereby advantageously increasing process efficiency, decreasing the need for operator intervention, and resulting in a more efficient use of resources.

In an alternate embodiment, a holding tank is also provided in fluid communication with the process tank to reduce the cycle time of the wash water treatment process. If the treatment process continues for a specified time and the emissions concentration remains above the predetermined acceptable level, the wash water is transferred from the process tank to the holding tank using a separate fluid circuit having a pump and a control valve. Fresh water is then supplied to the process tank and the cycle commences as described above. Of course, because the first portion of wash water now in the holding tank removed a majority of the VOC concentration in the articles being washed, the second portion of wash water will have a lower cycle time to reduce the VOC concentration to an acceptable level. After the treatment of the second portion of wash water is completed and the washer begins the normal wash cycle, the first portion of wash water is then recirculated through the process tank for treatment while the washer operates to clean the towels. This portion of wash water is then either passed on for further treatment, discharged to the environment, or reused during a subsequent wash cycle.

In accordance with another important aspect of the present invention, a method for treating a process fluid to remove contaminants using the apparatus of the present invention is also provided. The method includes the steps of supplying a process fluid to a process tank until a predetermined fluid level is reached, diffusing a gas through the process fluid for stripping contaminants with the diffused gas exiting the process fluid as exhaust, sensing an emission concentration in the exhaust, and circulating the process fluid through the process tank until a predetermined emission concentration level is reached. The treated fluid can then be released to the environment and the process repeated for a new batch of contaminated fluid.

Still other objects of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming apart of the specification, illustrate several aspects of the present invention and together with the description serve to explain the principles of the invention. In the drawings.

Reference will now be made in detail to the present preferred embodiment of the invention, an example of which is illustrated in the accompanying drawing.

DETAILED DESCRIPTION OF THE INVENTION

Figure 1:
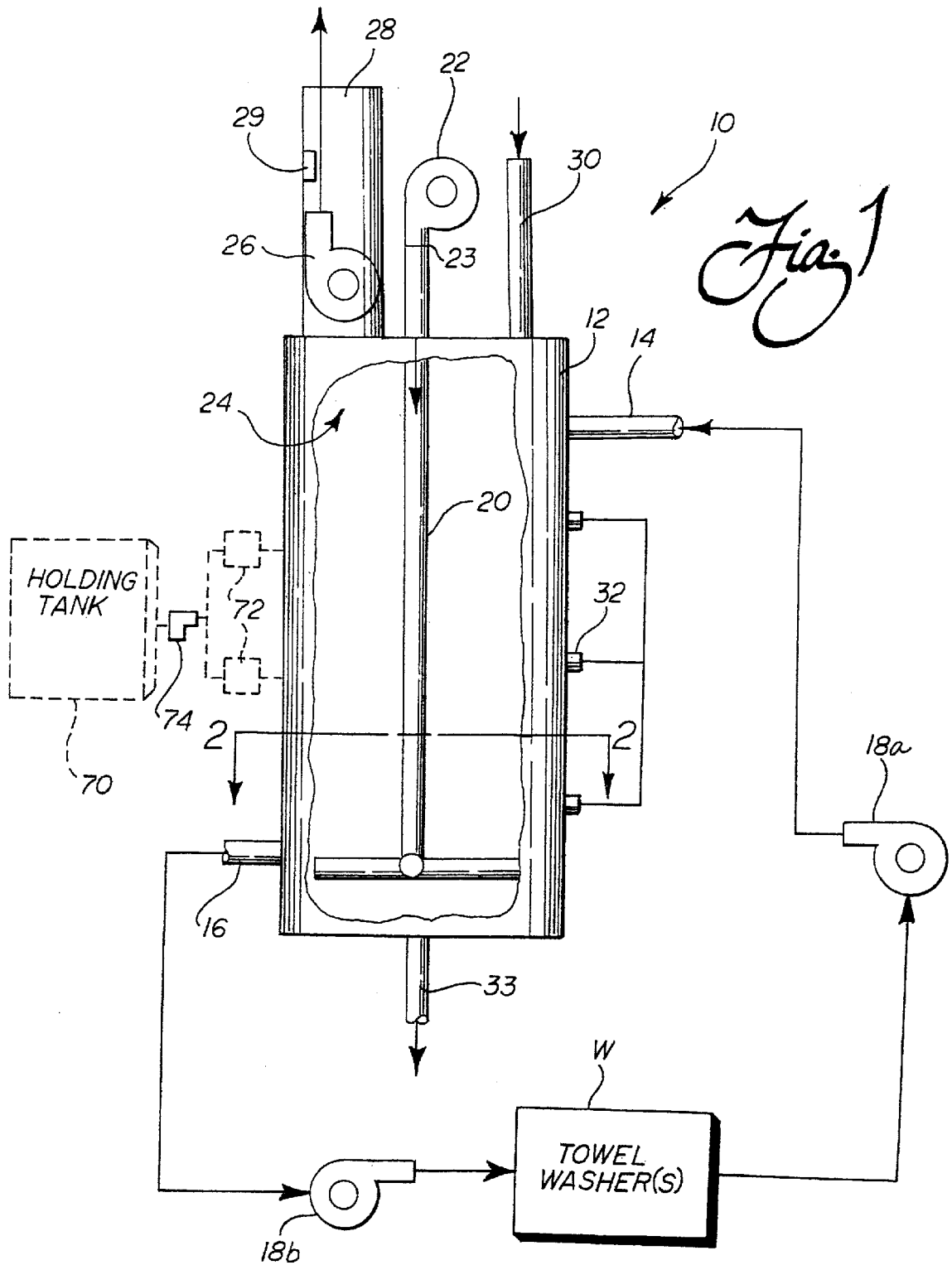
FIG. 1 is schematic diagram showing a preferred embodiment of the apparatus of the present invention.
Figure 2:
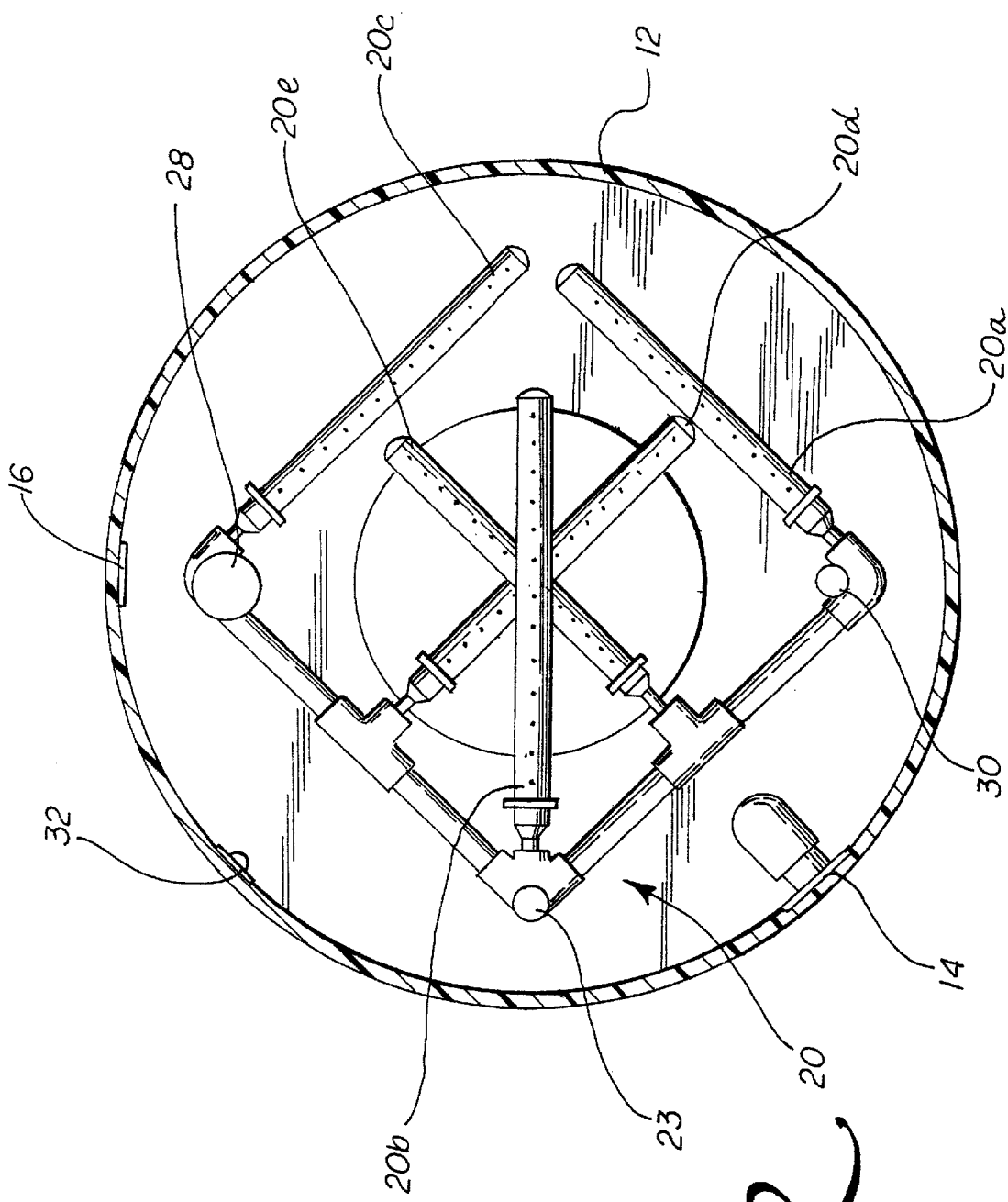
FIG. 2 is a cross-sectional view of the process tank showing the diffuser and various of the components of the apparatus.

Reference is now made to FIGS. 1 and 2 illustrating the preferred embodiment of the process fluid treatment apparatus 10 of the present invention. Additionally, reference will be made throughout this description to FIG. 3, which illustrates the interaction between the controller and various components of the apparatus in block diagram format. With specific reference now to FIG. 1, the apparatus 10 includes a process tank 12 for receiving a process fluid, such as wash water, that is contaminated with VOCs. The wash water may be considered to emanate from a washing apparatus W, such as a print towel washer, or similar apparatus used to remove VOCs from articles. Although shown with a single washer W, it should be appreciated that a single process tank could be used with a plurality of washers, each in parallel fluid communication with the process tank 12. The process tank 12 is preferably formed of a lightweight polymeric material, such as cross-linked polyethylene (XLPE) and includes an inlet 14 for receiving and an outlet 16 for releasing the wash water. In the illustrated preferred embodiment, the apparatus 10 includes two pumps—a first pump 18a for moving the wash water from the towel washer W to the inlet 14 of process tank 12 and a second pump 18b for moving the wash water from the outlet 16 of process tank 12 to the towel washer W. Together, the pumps 18a, 18b serve to circulate the wash water through the process tank 12 for treatment to remove contaminants. An example of a pump suitable for use in the apparatus 10 of the present invention is a stainless steel air diaphragm model manufactured by the McMaster-Carr Corporation. As should be appreciated, the flow rate of the pumps depends upon the capacity of the washer W and the process tank 12.

The removal of VOCs from the wash water is effected by diffusion. More particularly, and as is well known in the art, a gas such as ambient air is bubbled through the process fluid circulating through the process tank 12 to strip contaminants, such as (VOCs) from the fluid. To provide diffusion, the apparatus 10 includes a blower 22 that supplies ambient air to an air inlet 23 of a diffuser 20. An example of a blower that is suitable for use is a Roots Model 32URAI positive displacement rotary-lobe type blower unit equipped with a 5 horsepower, 3 phase, 230 volt explosion proof motor, which is capable of providing up to 50 cubic feet per minute at a maximum pressure of 10 psig. The blower 22 is preferably fitted with air intake filters to improve efficiency/reliability and intake/exhaust silencers to reduce noise output. Additionally, an air flow sensor (not shown) may be positioned downstream of the blower 22, such as in the air inlet 23 or the diffuser 20 to continuously measure the amount of air flow to the wash water. The non-diffusing elongate portion of the diffuser 20 is preferably covered with insulation where possible to prevent any heat damage from occurring to adjacent components.

As is best shown in FIG. 2, the diffuser 20 is further comprised of a plurality of diffuser arms 20a . . . 20e positioned at different levels and projecting in different directions to ensure that the air is finely diffused throughout the entire volume of wash water. In the preferred embodiment, each diffuser arm 20a . . . 20e is formed of 2-inch diameter iron pipe having a plurality of air holes formed therein to cause the air forced by the blower to bubble through the wash water. Although the preferred configuration is shown in FIG. 2, it should be appreciated that the diffuser arms 20a . . . 20e could be arranged in a number of ways or replaced with any well known means for diffusing air through a fluid.

After stripping the VOCs from the circulating wash water, the diffused air exits the fluid carrying a concentration of VOCs. A vent 24 formed in the top wall of the process tank 12 is provided for releasing the VOC laden exhaust from the tank, either to the atmosphere or for subsequent processing, such as by a catalytic oxidizer. In the preferred embodiment, an exhaust fan 26 is positioned or placed in fluid communication with the vent 24 to assist in expelling the exhaust from the process tank 12. Indeed, the use of an exhaust fan 26 is particularly important where a substantial concentration of VOCs are present in the diffused gas, since an accumulation of such vapors is often explosive. Because of the nature of the contaminated exhaust and the operating environment, the vent exhaust fan 26 is designed to be explosion-proof and is designed for use in harsh environments, and may be of any type well known in the art for such a purpose.

As shown in FIG. 1, it is contemplated that the vent 24 is positioned directly in an exhaust stack 28. Positioned within the stack 28 is a sensor 29 for detecting the contaminant emission concentration of the exhaust from the diffusion process. As described further below, the level of contaminant detected by this sensor 29 is important in the control of the treatment process.

Figure 3:
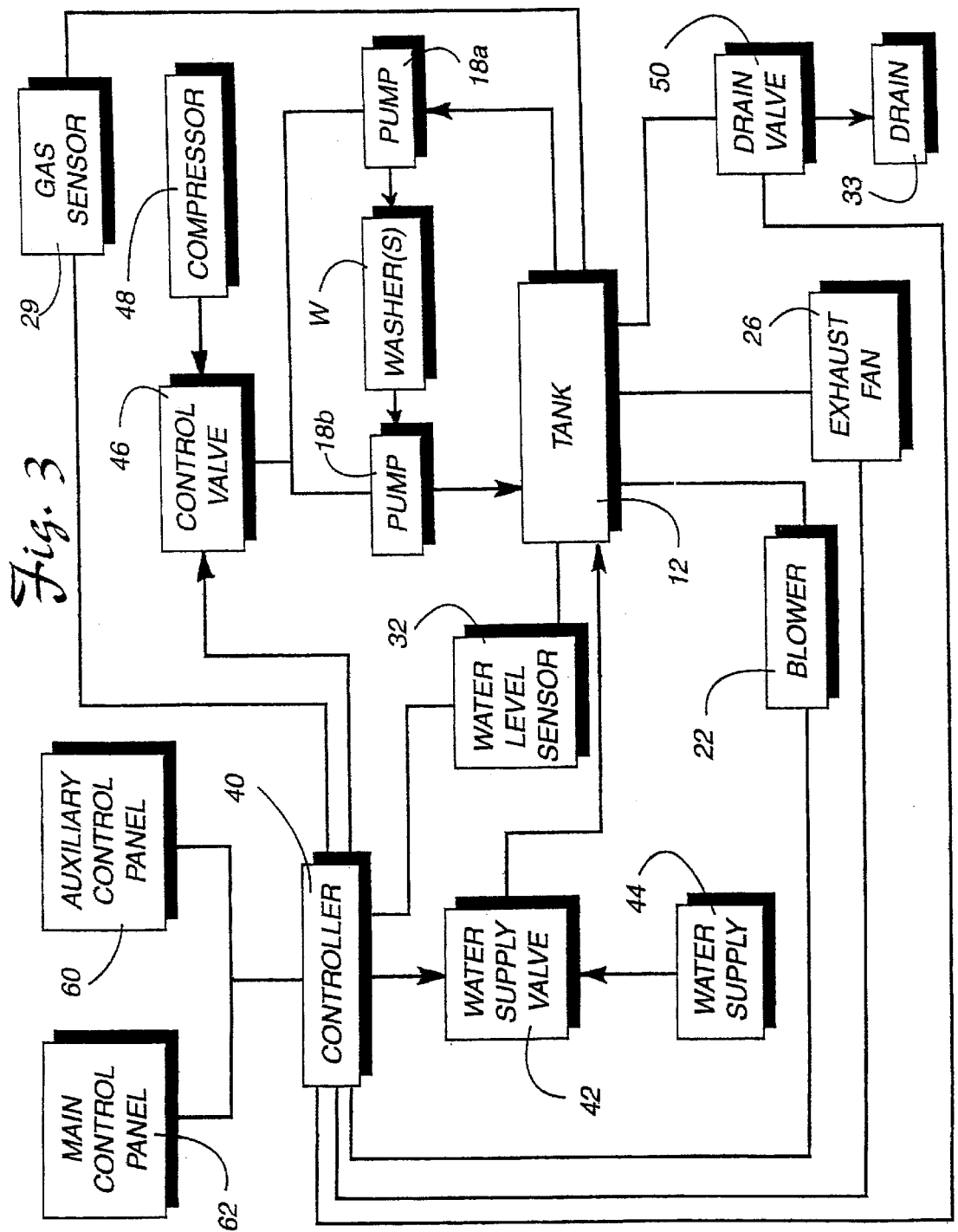
FIG. 3 is a block diagram illustrating the interaction between the various components and the controller to provide for the automatic process control.

The process tank 12 further includes a potable water inlet 30 which is connected to a water supply 44 (see block diagram in FIG. 3). The water supply 44 fills the process tank 12 with potable water prior to the commencement of the wash process. Sensors 32 positioned along the wall of the process tank 12 monitor the water level to ensure filling to a preferred level prior to commencement of the wash process. The process tank 12 is also provided with a drain 33 for releasing the water upon completion of the treatment process.

It should be appreciated that in addition to the components described above, the apparatus 12 is automatically controlled by the interaction between the sensor 29 and fluid level sensors 32, the process control valves, and the other components of the apparatus 10. Describing the operation of the apparatus 10 with specific reference to the block diagram shown in FIG. 3, the process is commenced by the controller 40 signaling water supply valve 42 to open. In the open position, this valve 42 allows potable water to flow from water supply 44 and fill the process tank 12. Filling is completed until the controller 40 receives signal from the water level sensors 32 in the process tank 12 that a predetermined level has been reached. After the process tank 12 is filled, the controller 40 then starts the blower 22 to supply ambient air to the diffuser 20 and simultaneously actuates the exhaust fan 26 to remove the diffused air exhausting from the wash water. Air stripping then commences and the controller 40 signals a control valve 46 to open. Control valve 46 permits compressed air to flow from a compressor 48 to the air diaphragm pumps 18a, 18b which move the wash water present in washer W to the process tank 12 and visa versa. As should be appreciated, during the treatment process for the removal of VOCs, the normal print towel wash cycle in the washer W is interrupted, and any regular water inlet and outlet in the washer W is closed to force wash water circulation through the process tank 12.

During recirculation, the position of the control valve 40 is adjusted by the controller 40 to adjust the flow of compressed air to the pumps 18a, 18b and provide the optimum flow of wash water through the process tank 12. To monitor the fluid flow rate through the circuit, one or more flow meters (not shown) are provided and may be connected to the controller 40 to monitor wash water circulation. As the water continuously circulates through the process tank 12, the controller 40 receives signals from the gas sensor 29 on the concentration of the VOCs in the exhaust exiting through vent 28. When the VOC emission concentration reaches the predetermined acceptable level, the controller 40 then signals the pumps 18a, 18b, blower 22, and exhaust fan 26 to stop. To ensure that the VOC level is reduced to below an acceptable level, it is also contemplated that an internal timer routine in the controller 40 runs the process for approximately thirty additional minutes, although the time may be field adjusted depending upon the volume of process fluid and the amounts of VOCs initially presented. After the predetermined level is reached and the additional stripping routine is completed, if desired, the controller 40 then signals a drain valve 50 in the floor of the process tank 12 to open and release the treated water to the environment via drain 33 or on for further processing to remove other contaminants.

In the preferred embodiment, the apparatus is fully automatic, with the controller 40 being a microprocessor that is programmed by a portable computer or the like running software which permits the necessary process control information, such as the preferred fluid level, the predetermined acceptable VOC emissions concentration level, and any other parameters that are necessary to ensure the safe and effective operation of the apparatus 10. Additionally, the cycling of the process through the various stages (i.e. filling the process tank, commencing stripping, additional cycling, release of water) are indicated on a main display panel 60 which is positioned adjacent to the process tank 12. If the set up of the apparatus 10 is such that the process tank 12 is remotely positioned relative to the washer W, an auxiliary panel 62 is provided for placement adjacent to the washer W. Both panels 60, 62 may include various signal outputs, such as lights, LEDs, alarms, etc. to inform the observer of the proceedings and also may include various inputs, such as a start button to commence the treatment process and stop button which will permit an operator to shut down the apparatus in the event of a problem.

As shown in phantom in FIG. 1, it is also contemplated that a holding tank 70 may be included in the apparatus 10 to reduce the process time of the wash water treatment cycle. The holding tank 70 is placed in fluid communication with the process tank 12 using control valves 72 and at least one pump 74 that are selectively actuated by the controller 40. If during the treatment process, the treatment cycle exceeds a certain specified amount of time without the desired reduction in VOCs, as monitored by the sensor 29 and evaluated by the controller 40, the first portion of wash water is transferred to the holding tank 70. This may be completed by closing valves (not shown) positioned in the inlet 14 and outlet of the process tank 12, opening the valves 72 between the process tank and the holding tank 74, and actuating the pump 74. Once the wash water is in the holding tank 70, the process restarts as described above with potable water being supplied to the process tank 12 and circulating through the washer. As should be appreciated, because the first portion of water removed a substantial amount of VOCs from the articles, the second portion of water will contain a substantially lower concentration of these compounds and will thus, have a shorter cycle time. After being treated as described above (that is, when an acceptable level of VOCs or contaminant is detected in the exhaust), the second portion of water is then discharged or returned to the washer W and the regular wash cycle begins. During the regular wash cycle, the water in the holding tank 70 can then be recirculated through the process tank 12 to remove the residual VOCs. This first portion of water is then either treated further to remove other contaminants or discharged to the environment.

In addition to the above-described apparatus 10, a method of treating a process fluid is also contemplated. As described briefly above, the method includes the steps of supplying the process fluid to a process tank 12 until a predetermined fluid level is reached, diffusing a gas through the process fluid for stripping contaminants with the diffused gas exiting the process fluid as an exhaust gas, sensing a contaminant emission concentration in the exhaust gas, and circulating the process fluid through the process tank until said contaminant emission concentration level reaches a predetermined level. Upon reaching the predetermined level, the process fluid is discharged through a drain to the environment or to another apparatus further processing and the method may be repeated with the next volume of process fluid requiring treatment.

In summary, an automatically controlled apparatus 10 is provided for effecting the continuous removal of contaminants, such as volatile organic compounds (VOCs) from a process fluid, such as water used to wash print towels or the like. The apparatus 10 includes one or more pumps 18a, 18b for circulating wash water from a washer W to a process tank 12. A diffuser 20 air strips the contaminants from the wash water as it circulates through the process tank 12. The diffused gas is exhausted through a vent 24 and a contaminant emissions concentration sensor 29 positioned adjacent to the vent 24 detects the emission of VOCs in the exhaust (see FIG. 1). A controller 40 signals the pumps to vary the circulation based on the difference between the actual VOC emission concentration of the exhaust and a predetermined acceptable level (FIG. 3). The wash water is then continuously recirculated and treated until a predetermined emissions concentration is reached, after which a drain 33 in the tank 12 releases the treated wash water to the environment or to another apparatus for further processing. To reduce the process time of the cycle, a separate holding tank 70 may be provided for receiving a first portion of wash water contaminated with a relatively high concentration of VOCs while a second portion contaminated with a relatively low concentration of VOCs circulates and is treated. A method of treating a process fluid to remove contaminants is also provided.

The foregoing description of a preferred embodiment of the process fluid treatment apparatus of the present invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

What is claimed is:

1. An apparatus for treating a process fluid to remove contaminants, comprising:
    a process tank having an inlet for receiving the process fluid, a fluid level sensor, a vent, and an outlet for the process fluid;
    at least one pump for circulating the process fluid to and from said process tank;
    a diffuser for diffusing a gas through the circulating process fluid, said gas exhausting through said vent;
    a gas sensor adjacent to said vent for detecting a contaminant emission concentration in said exhaust gas;
    a controller operable for receiving signals from said fluid level and gas sensors and actuating said at least one pump such that the process fluid is circulated through said process tank until a predetermined level of contaminant emission concentration is reached.

2. The apparatus according to claim 1, wherein said process tank includes an external inlet for receiving a fresh fluid.

3. The apparatus according to claim 2, wherein said process tank further includes a valve for draining the process fluid, said valve opening in response to a signal from said controller at a time after said exhaust gas reaches the predetermined level of contaminant emission concentration.

4. The apparatus according to claim 1, further including a blower for supplying said gas to said diffuser, said blower actuated by said controller in response to a signal received from said fluid level sensor.

5. The apparatus according to claim 4, further including a fan adjacent to said vent for pulling said exhaust gas therethrough, said fan being actuated simultaneously with said blower.

6. The apparatus according to claim 1, wherein said at least one pump is pneumatic and said apparatus further includes at least one compressor for supplying compressed air to operate said at least one pump.

7. The apparatus according to claim 6, further including at least one control valve associated with said at least one compressor, said controller selectively actuating said control valve to adjust the flow of compressed air to said at least one pump to alter a corresponding rate of fluid flow to and from said process tank.

8. The apparatus according to claim 1, further including a holding tank in fluid communication with said process tank for receiving and holding a first portion of the process fluid while a second portion of the process fluid is circulated through the process tank.

9. The apparatus according to claim 8, further including at least one pump for moving said first portion of the process fluid between said holding tank and said process tank.

10. The apparatus according to claim 9, further including at least one control valve for controlling fluid flow between said holding tank and said process tank.

11. A method for treating a process fluid to remove contaminants, comprising:
    supplying the process fluid to a tank until a predetermined fluid level is reached;
    diffusing a gas through the process fluid to strip contaminants from the process fluid, said diffused gas exiting the process fluid as an exhaust gas;
    sensing a contaminant emission concentration in the exhaust gas;
    circulating the process fluid through the tank, while continuing the diffusing, until said emission concentration level reaches a predetermined level.

12. The method according to claim 11, further including the step of venting the exhaust gas from the tank.

13. The method according to claim 12, further including the step of releasing the process fluid from the tank at a time after the predetermined emission concentration level is reached.

* * * * *